(12) United States Patent
Yang et al.

(10) Patent No.: US 11,433,541 B2
(45) Date of Patent: Sep. 6, 2022

(54) AUTOMATED CALIBRATION SYSTEM AND METHOD FOR A WORKPIECE COORDINATE FRAME OF A ROBOT

(71) Applicant: Industrial Technology Research Institute, Hsin-Chu (TW)

(72) Inventors: Chwen-Yi Yang, Hualien County (TW); Cheng-Kai Huang, Taichung (TW); Jan-Hao Chen, Changhua County (TW); Yi-Ying Lin, Taichung (TW); Bing-Cheng Hsu, Changhua County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 398 days.

(21) Appl. No.: 16/728,017

(22) Filed: Dec. 27, 2019

(65) Prior Publication Data
US 2021/0187745 A1 Jun. 24, 2021

(30) Foreign Application Priority Data
Dec. 18, 2019 (CN) .......................... 201911308696.3

(51) Int. Cl.
*B25J 9/16* (2006.01)
*G05B 19/401* (2006.01)
*B25J 19/02* (2006.01)

(52) U.S. Cl.
CPC ........... *B25J 9/1692* (2013.01); *B25J 9/1671* (2013.01); *B25J 19/021* (2013.01); *G05B 19/4015* (2013.01); *G05B 2219/39021* (2013.01)

(58) Field of Classification Search
CPC ...... B25J 9/1692; B25J 9/1671; B25J 19/021; G05B 19/4015; G05B 2219/39021
See application file for complete search history.

(56) References Cited

U.S. PATENT DOCUMENTS

| 6,959,253 B2 | 10/2005 | Jackson et al. |
| 7,945,349 B2 | 5/2011 | Svensson et al. |

(Continued)

FOREIGN PATENT DOCUMENTS

| CN | 101282823 A | 10/2008 |
| CN | 100489448 C | 5/2009 |

(Continued)

OTHER PUBLICATIONS

Jingguo Ge et al., "An Automatic Industrial Robot Cell Calibration Method", Conference ISR ROBOTIK 2014,pp. 389-394, VDE Verlag GMBH Berlin—Offenbach.

(Continued)

*Primary Examiner* — Jeff A Burke
*Assistant Examiner* — Arslan Azhar
(74) *Attorney, Agent, or Firm* — WPAT, PC (57) ABSTRACT

An automated calibration system for a workpiece coordinate frame of a robot includes a physical image sensor having a first image central axis, and a controller for controlling the physical image sensor adapted on a robot to rotate by an angle to set up a virtual image sensor having a second image central axis. The first and the second image central axes are intersected at an intersection point. The controller controls the robot to repeatedly move back and forth a characteristic point on the workpiece between these two axes until the characteristic point overlaps the intersection point. The controller records a calibration point including coordinates of joints of the robot, then the controller moves another characteristic point and repeats the foregoing movement to generate several other calibration points. According to the calibration points, the controller calculates relative coordinates of a virtual tool center point and the workpiece to the robot.

18 Claims, 9 Drawing Sheets

(56) References Cited

U.S. PATENT DOCUMENTS

| | | | |
|---|---|---|---|
| 7,979,159 B2 | 7/2011 | Fixell | |
| 9,002,516 B2 | 4/2015 | Chiu et al. | |
| 9,193,073 B1* | 11/2015 | Huang | B25J 9/1692 |
| 2008/0188986 A1* | 8/2008 | Hoppe | B25J 9/1692 |
| | | | 901/41 |
| 2009/0157226 A1 | 6/2009 | de Smet | |
| 2015/0224649 A1* | 8/2015 | Watanabe | G05B 19/4083 |
| | | | 700/259 |
| 2018/0004188 A1* | 1/2018 | Yamaguchi | B25J 9/16 |
| 2019/0099887 A1 | 4/2019 | Huang et al. | |

FOREIGN PATENT DOCUMENTS

| | | |
|---|---|---|
| CN | 100489449 C | 5/2009 |
| CN | 101656840 A | 2/2010 |
| CN | 102567989 A | 7/2012 |
| CN | 102015221 B | 9/2012 |
| CN | 102760234 A | 10/2012 |
| CN | 103101060 A | 5/2013 |
| CN | 102119072 B | 9/2013 |
| CN | 103322953 A | 9/2013 |
| CN | 106671080 A | 5/2017 |
| CN | 107553475 A | 1/2018 |
| DE | 102007056773 A1 | 12/2012 |
| TW | 201247373 | 12/2012 |
| TW | 201313415 | 4/2013 |
| TW | 201315577 | 4/2013 |
| TW | I420066 | 12/2013 |
| TW | 201900358 A | 1/2019 |
| TW | 201915625 | 4/2019 |
| WO | WO2009132703 A1 | 11/2009 |
| WO | WO2014042668 A2 | 3/2014 |
| WO | WO2018085984 A1 | 5/2018 |

OTHER PUBLICATIONS

A. Watanabe et al., "Autonomous Visual Measurement for Accurate Setting of Workpieces in Robotic Cells", 2005, CIRP Annals.

Frank Shaopeng Cheng, "Calibration of Robot Reference Frames for Enhanced Robot Positioning Accuracy", Sep. 1, 2008, Robot Manipulators.

Shibin Yin et al., "A Vision-Based Self-Calibration Method for Robotic Visual Inspection Systems", Dec. 3, 2013, pp. 16565-16582, Sensors.

Gustav Bergström, "Method for calibration of off-line generated robot program", 2011, Chalmers University of Technology.

Erik Hultman et al., "Six-Degrees-of-Freedom (6-DOF) Work Object Positional Calibration Using a Robot-Held Proximity Sensor", Aug. 23, 2013, pp. 63-80, Machines.

Billibon H. Yoshimi et al., "Active, Uncalibrated Visual Servoing", 1994, pp. 156-161, IEEE.

* cited by examiner

FIG. 9

AUTOMATED CALIBRATION SYSTEM AND METHOD FOR A WORKPIECE COORDINATE FRAME OF A ROBOT

CROSS REFERENCE TO RELATED APPLICATION

This application claims the benefits of Chinese application Serial No. 201911308696.3, filed on Dec. 18, 2019, the disclosures of which are incorporated by references herein in its entirety.

TECHNICAL FIELD

The present disclosure relates in general to an automated calibration system for a coordinate frame, and more particularly to an automated calibration system for a workpiece coordinate frame of a robot. In addition, this present disclosure also relates in general to an automated calibration method applied to the automated calibration system for the workpiece coordinate frame of the robot.

BACKGROUND

As technology progresses, various robots have been applied more and more widely to different fields. Generally, a typical robot is formed as an articulated robot arm having multiple joints, and usually furnished with a tool at an end of the robot arm, such as a welding tool, a drilling tool and so on. However, automation application of the robot is obtained anyway through human teaching in advance.

Prior to the work of robot, a position of a tool center point (TCP) needs to be precisely calibrated, such that a controller of the robot can instruct a tooling having the TCP to move along an expected path.

Nevertheless, as the working path of the robot goes more and more complicated, accuracy of the working path is highly affected by the precision of the robot. In addition, position accuracy of the robot with respect to the workpiece coordinate system can affect directly the performance of the robot. Thus, the accuracy of the workpiece coordinate system is one of important factors for precisely operating the robot.

Currently, while the robot is to be automatically operated, the relative position relationship between the workpiece and the robot shall be confirmed in advance. However, position bias is always possible due to precision of positioning devices, manufacturing tolerances upon the workpiece and so on. Thus, prior to the robot work, precise coordinates for manufacturing shall be confirmed in advance with relevant calibrations in positioning the workpiece.

Conventionally, a typical position calibration method for a workpiece is to overlap the TCP and each of the designated points at the workpiece through human teaching, and record coordinates of the workpiece at each individual coinciding.

In the human teaching, the robot is taught to overlap the tool center with each of multiple designated points in a workpiece coordinate system, and then the calibration can be complete. However, operational performance of this calibration method is highly influenced by the user's experience. In addition, operation of the calibration method is also degraded by less accuracy of the robot and some not proper operational behaviors, from which the tool center might collide and thus damage the workpiece.

On the other hand, an automated calibration method is also introduced in the art. However, this automated calibration method does have the following disadvantages.

(1) In this conventional automated calibration method, external image sensors are required for monitoring the robot, and, through the designated points to overlap target points or to measure distances with the target points, coordinates of the workpiece can be thus corrected. While in performing this calibration method to different tooling, it is quite possible that images of some designated points might be blocked by the robot itself or some other objects.

(2) According to this conventional calibration method, the image sensors are mounted to measure in advance so as to confirm relative positions between the sensors and the robot, or a control center is applied to directly touch the workpiece. However, both of the aforesaid operations may damage the workpiece, and human operation error might be inevitable.

(3) In this conventional calibration method, a CAD file can be alternatively applied to obtain relative distances between the robot and the calibration device or the workpiece. However, the foregoing operation is time-consuming, and also the workpiece shall have obvious characteristic points so that practical measurements can be successfully made to reduce possible errors.

This disclosure is an improvement of a previous patent application of utility, titled as "System and method for calibrating tool center point of robot", with application Ser. No. 15/845,168 filed on Dec. 18, 2017, and hereinafter "the prior application".

In this disclosure, improvements over the prior application include at least the following.

(1) Images of the designated points can be always obtained without obstacles such as the robot itself or the tooling to block the image sensors.

(2) Cost for constructing the entire system is substantially reduced.

Thus, the automated calibration system for a workpiece coordinate frame of a robot and the method thereof provided by this disclosure can perform calibration without direct contacting or colliding the workpiece, can avoid blocking by the robot itself or the tooling, needs not to calibrate the position relationship between the image sensors and the robot prior to practical operations, needs no additional image sensors above the workpiece, can complete the position calibration of the workpiece in one single step, and can improve various disadvantages of the prior art.

SUMMARY

In one embodiment of this disclosure, an automated calibration system for a workpiece coordinate frame of a robot includes a physical image sensor having a first image central axis and disposed on a flange of the robot, and a controller for controlling the physical image sensor and the robot to rotate by an angle to construct a virtual image sensor having a second image central axis. The second image central axis and first image central axis are intersected at an intersection point. The controller controls the robot to move repeatedly a characteristic point on a workpiece back and forth between the first image central axis and the second image central axis until the characteristic point overlaps the intersection point, the characteristic point as a calibration point including coordinates of a plurality of joints of the robot is recorded, then a next characteristic point is introduced to repeat the aforesaid movement for overlapping the intersection point again and again until a number of the plurality of calibration points is accepted, and each of the plurality of calibration points is evaluated to calculate coordinates of a virtual tool center point and the workpiece with respect to the robot.

In another embodiment of this disclosure, an automated calibration method for a workpiece coordinate frame of a robot, includes a step of providing a physical image sensor, forming an image coordinate system and having a first image central axis, disposed on a flange at an end of the robot; a step of applying the controller to rotate by an angle the physical image sensor and the robot to construct a virtual image sensor having a second image central axis, the second image central axis intersecting the first image central axis to form an intersection point; a step of the controller controlling the robot to move repeatedly a characteristic point on a workpiece back and forth between the first image central axis and the second image central axis, until the characteristic point and the intersection point are overlapped, and recording as a calibration point including coordinates of a plurality of joints of the robot; a step of the controller controlling the robot to move a next characteristic point according to the aforesaid movement to overlap the intersection point so as to generate a plurality of other calibration points; and, a step of based on each of the plurality of calibration points to calculate coordinates of a virtual tool center point and the workpiece with respect to the robot.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
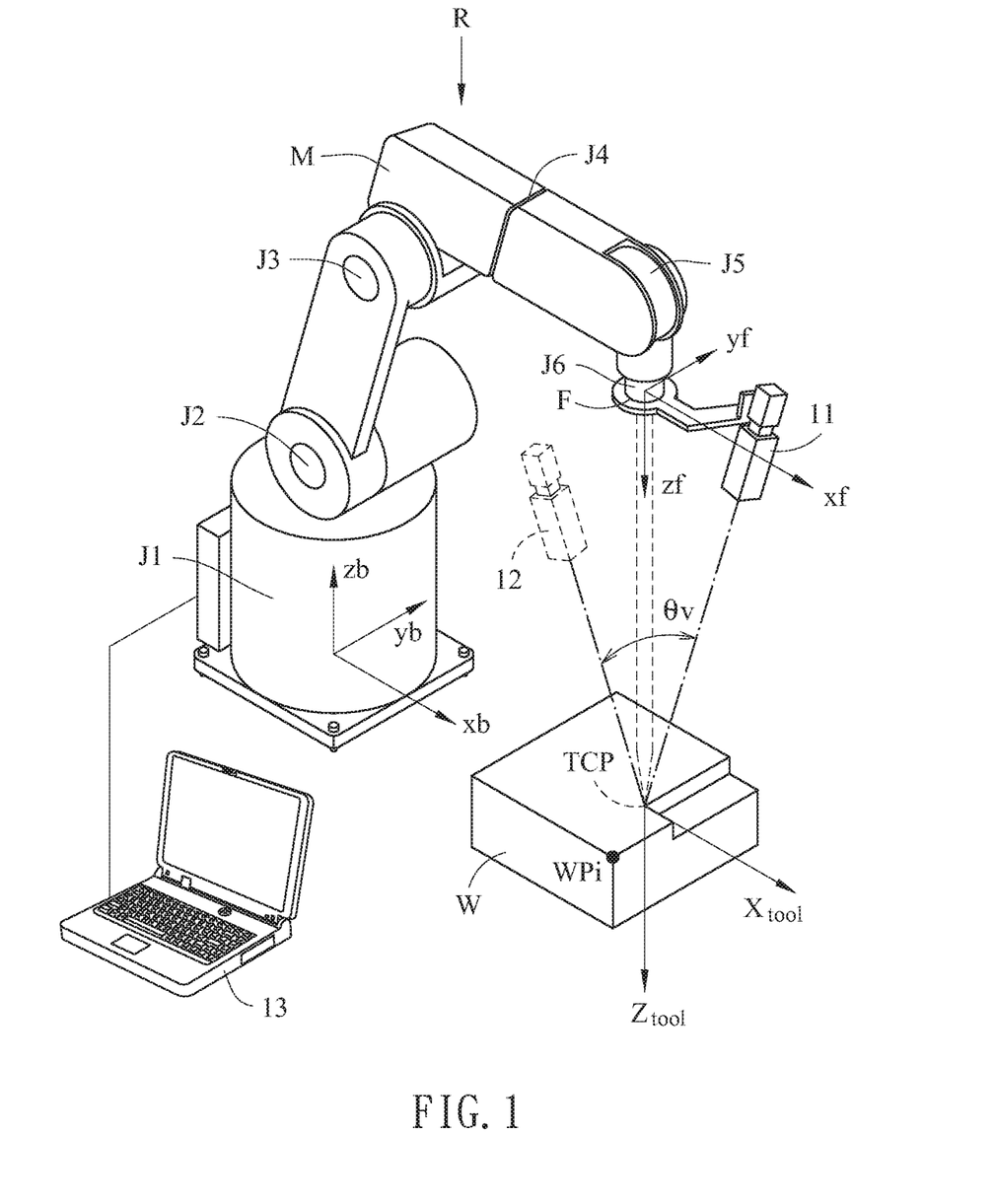
FIG. 1 is a schematic framework of a first embodiment of the automated calibration system for a workpiece coordinate frame of a robot in accordance with this disclosure.

Referring to the system framework of FIG. 1, the automated calibration system 1 for a workpiece coordinate frame of a robot, applied to a robot R, includes a physical image sensor 11, a virtual image sensor 12 and a controller 13. In this embodiment, the controller 13 can be a controller of the robot R, an independent computer device, or any the like. The physical image sensor 11 can be a physical camera or the like image-capturing device. The robot R, preferably a robot arm, includes a main body M having a plurality of joints J1~J6. The virtual image sensor 12 can be simulated by the physical image sensor 11, i.e., without a physical body. In addition, the automated calibration system 1 for a workpiece coordinate frame of a robot can be used for calculating coordinates of a virtual tool center point TCP and the workpiece W, in which the virtual tool center point TCP is referred to a physical tooling mounted lately at the end of the robot arm.

It shall be emphasized that, in the system and method provided by this disclosure, the physical tooling is not needed during the calibration process, but the characteristic points or the designated points on the workpiece W are used for calibration. On the workpiece W, the only one requirement to be a qualified characteristic point is any point within an intersection region of the visual fields of the physical image sensor 11 and the virtual image sensor 12, such as a center or an intersection point of lines and planes. As shown in FIG. 1, the characteristic point WPi is located at the intersection point of three surfaces. However, in this disclosure, the intersection point can be at another position.

The physical image sensor 11 has a visual field which has a first image central axis A, and is disposed on a flange F at an end of the robot R. The flange F is defined with a coordinate system $(x_f\text{-}y_f\text{-}z_f)$. The visual field of the physical image sensor 11 intersects a Z axis $(z_f)$ originated at a center of the flange F, and the Z axis $(z_f)$ is perpendicular to a horizontal plane expanded by an X axis $(x_f)$ and a Y axis $(y_f)$ of the coordinate system $(x_f\text{-}y_f\text{-}z_f)$.

Figure 2A:
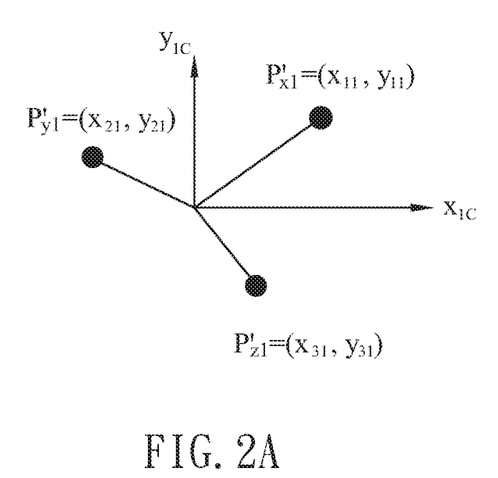
FIGS. 2A-2B demonstrate schematically transformation relationships for the first embodiment of FIG. 1.
Figure 2B:
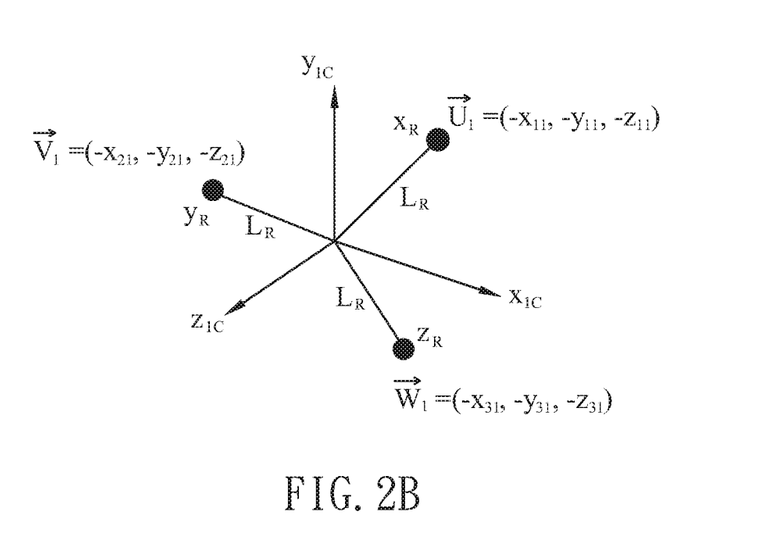

FIG. 2A demonstrates vector positions captured by the physical image sensor 11, and FIG. 2B shows relationships between the positions of FIG. 2A and the coordinate system $(x_{1C}\text{-}y_{1C}\text{-}z_{1C})$ of the physical image sensor 11. As shown in FIG. 2A and FIG. 2B, prior to perform calibration upon the workpiece coordinates, a transformation relationship between the coordinate system $(x_R\text{-}y_R\text{-}z_R)$ of the robot R and the coordinate system $(x_{1C}\text{-}y_{1C}\text{-}z_{1C})$ of the physical image sensor 11 shall be derived in advance.

Firstly, after the robot R moves an arbitrary designated point on the workpiece W into an arbitrary position within the visual field of the physical image sensor 11, then the position of the designated point is defined as an origin O (not shown in the figure) for an image coordinate system. The image coordinate system is the coordinate system $(x_{1C}\text{-}y_{1C}\text{-}z_{1C})$ formed by the images captured by the physical image sensor 11.

After the origin O is moved to overlap a designated point, the robot R moves in an $x_R$ direction of the coordinate system of the robot R by an arbitrary distance LR so as to obtain a projected coordinate point $P'_{x1}=(x_{11}, y_{11})$ of the physical image sensor 11, and a spatial vector for this point $P'_{x1}=(x_{11}, y_{11})$ is defined as $\vec{U_1}=(-x_{11}, -y_{11}, -z_{11})$.

Similarly, after the origin O is moved to overlap another designated point, the robot R moves in an $y_R$ direction of the coordinate system of the robot R by the arbitrary distance LR so as to obtain another projected coordinate point $P'_{y1}=(x_{21}, y_{21})$ of the physical image sensor 11, and a spatial vector for this point $P'_{y1}=(x_{21}, y_{21})$ is defined as $\vec{V_1}=(-x_{21}, -y_{21}, -z_{21})$.

Similarly, after the origin O is moved to overlap a further designated point, the robot R moves in an $z_R$ direction of the coordinate system of the robot R by the arbitrary distance LR so as to obtain a further projected coordinate point $P'_{z1}=(x_{31}, y_{31})$ of the physical image sensor 11, and a spatial vector for this point $P'_{z1}=(x_{31},y_{31})$ is defined as $\vec{W_1}=(-x_{31}, -y_{31}, -z_{31})$.

According to orthogonality of the coordinate system, following simultaneous equations can be obtained:

$$\vec{U_1}\cdot\vec{V_1}=0 \quad (1)$$

$$\vec{V_1}\cdot\vec{W_1}=0 \quad (2)$$

$$\vec{U_1}\cdot\vec{W_1}=0 \quad (3)$$

Thus, constant vectors $\vec{U_1}, \vec{V_1}, \vec{W_1}$ can be obtained.

Theoretically, these simultaneous equations have two sets of solutions, $(z_{11}, z_{21}, z_{31})$ and $(z_{12}, z_{22}, z_{32})$, in which $(z_{11}, z_{21}, z_{31})=-(z_{12}, z_{22}, z_{32})$. Thus, the distance variation between two arbitrary designated points on the workpiece in the image can be utilized to judge whether, while in moving in the coordinate system $(x_R\text{-}y_R\text{-}z_R)$ of the robot R, the designated point moves toward or away from the physical image sensor 11, such that the correct branch solution can be determined.

Hence, coordinates of the physical image sensor 11 with respect to the coordinate system of the flange F is:

$$^{flange}T_{CCD} = (^{base}T_{flange})^{-1}\begin{bmatrix} \dfrac{\vec{U_1}}{\|\vec{U_1}\|} & \dfrac{\vec{V_1}}{\|\vec{V_1}\|} & \dfrac{\vec{W_1}}{\|\vec{W_1}\|} \end{bmatrix} \quad (4)$$

in which $^{flange}T_{CCD}$ stands for the coordinates of the physical image sensor 11 with respect to the coordinate system of the flange F, and $^{base}T_{flange}$ stands for the coordinates of the flange F with respect to the base coordinate system $(x_b\text{-}y_b\text{-}z_b)$ of the robot R.

Thereupon, the transformation relationship between the coordinate system of the robot R and that of the physical image sensor 11 can be obtained as follows:

$$S_R = {}^{base}T_{flange}{}^{flange}T_{CCD}S_c \quad (5)$$

in which $S_c$ stands for the movement in the coordinate system $(x_{1C}\text{-}y_{1C}\text{-}z_{1C})$ of the physical image sensor 11, and $S_R$ stands for the movement in the coordinate system $(x_R\text{-}y_R\text{-}z_R)$ of the robot R.

After the transformation relationship of coordinate systems between the physical image sensor 11 and the robot R has been established, then any point within the visual field of the physical image sensor 11 is rotated, with respect to an arbitrary coordinate axis of the flange F, by an angle $\theta_v$ to generate a second viewing angle to locate the virtual image sensor 12, as shown in FIG. 1. Namely, the virtual image sensor 12 is substantially a simulated object from the physical image sensor 11.

Figure 3A:
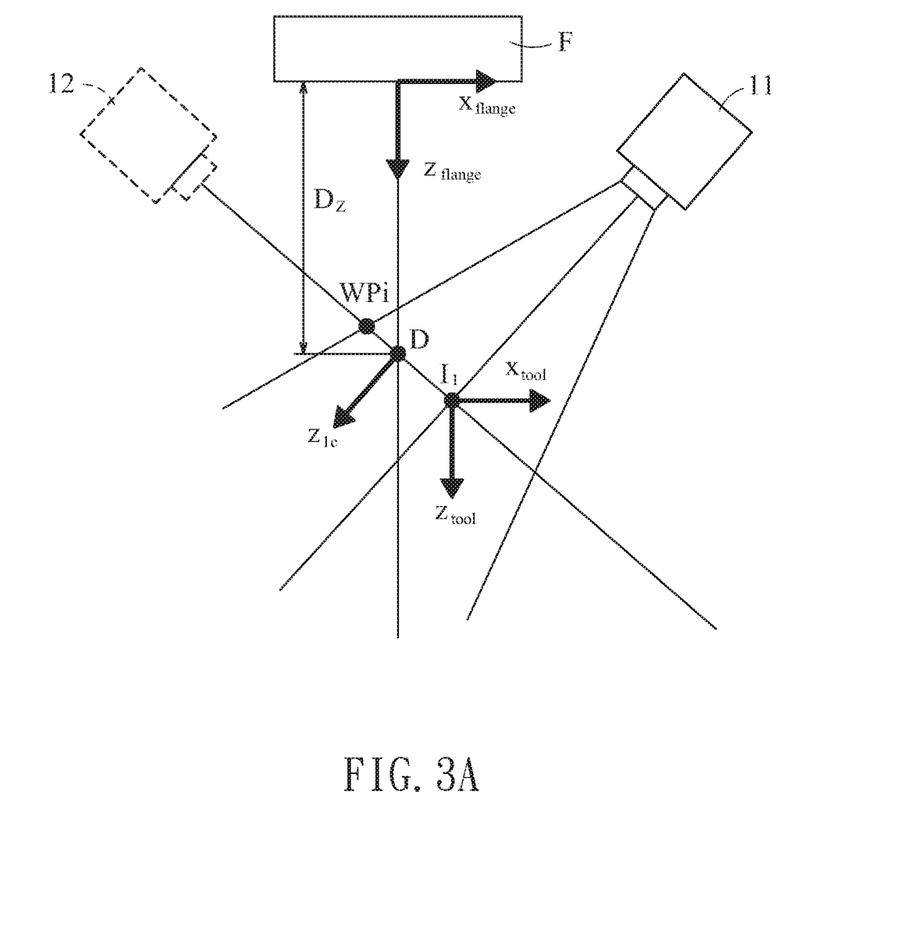
FIGS. 3A-3B demonstrate schematically constructing steps for the first embodiment of FIG. 1.
Figure 3B:
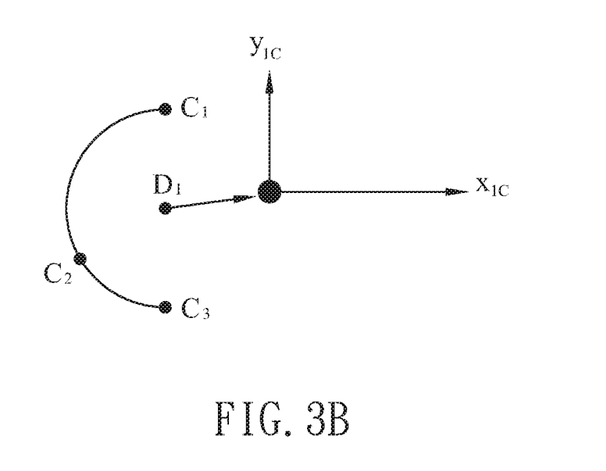

Referring now to FIG. 3A and FIG. 3B, methods for deriving the coordinates of the virtual tool center point TCP and for constructing the virtual image sensor 12 are explained as follows.

Step (a): Move the robot R to an arbitrary characteristic point WPi within the visual field of the physical image sensor 11, and assign $[0, 0, D_Z]$ to be the coordinates of another arbitrary point D within the visual field with respect to the flange F, i.e., $D=[0, 0, D_Z]$ as shown in FIG. 3A.

Step (b): Apply the physical image sensor 11 to obtain a coordinate $C_1$ of the characteristic point WPi with respect to the image coordinate system, and then the physical image sensor 11 rotates twice about the Z axis ($z_{1c}$ axis) so as to generate two coordinates $C_2$ and $C_3$. Further, according to the arcs formed by coordinates $C_1, C_2, C_3$, calculate a center position D1, as shown in FIG. 3B.

Step (c): Calculate a vector $\overrightarrow{(D_1I_1)}_c$ from the center position $D_1$ to a tool-image center I1, and transform the vector $\overrightarrow{(D_1I_1)}_c$ into a vector with respect to the flange F, i.e., vector $\overrightarrow{(D_1I_1)}_f = {}^{flange}T_{CCD}\overrightarrow{(D_1I_1)}_c$. The tool-image center I1 is the intersection point of the Z axis (ztool) of the tooling coordinate system and the first image central axis A.

Step (d): Correct the coordinate of point D by $D=D+L\overrightarrow{(D_1I_1)}_f$, in which $L()$ stands for a distance function. Then, go back to perform Step (a), until the center position $D_1$ overlaps the image center point I1. Thus, coordinate I of the virtual tool center point can be obtained. Based on each change at the vector $\overrightarrow{(D_1I_1)}_c$, adjust constants of the function $L()$.

Step (e): Rotate the physical image sensor 11 an angle $\theta_v$ about an arbitrary coordinate axis of the flange F so as to generate the second viewing angle to locate the virtual image sensor 12.

Figure 4:
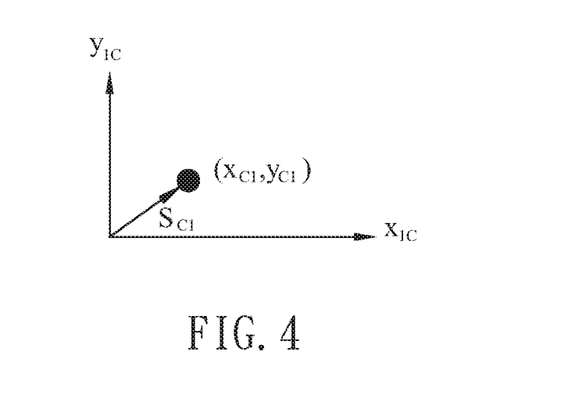
FIG. 4 shows schematically a visual servo view for the first embodiment of FIG. 1.

Referring to FIG. 4, apply a visual servo means to move the physical image sensor 11 so as to have a designated or characteristic point on the workpiece to fall at the visual axis. From the captured image information, coordinates in the image-sensor coordinate system for the designated point can be obtained, and then a corresponding servo motion can be calculated accordingly for controlling the robot. The aforesaid process can be performed by the following steps.

Step (a1): Apply the physical image sensor 11 to capture the image information including coordinates $(x_{c1}, y_{c1})$ of the designated point with respect to the physical image sensor 11.

Step (b1): Transform $$S_c = \frac{(x_{C1}, y_{C1})}{\sqrt{x_{C1}^2 + y_{C1}^2}}$$

into $S_R = {}^{base}T_{flange}{}^{flange}T_{CCD}S_c$ in the coordinate system of the robot R, as shown in FIG. 4.

Step (c1): Move the robot R along SR, until the designated point reaches the coordinate axis of the physical image sensor 11.

Step (d1): If the designated point does not overlap the center point of the physical image sensor 11, then go back to perform Step (a1). Otherwise, if the designated point overlaps the intersection points of axial lines, then the visual servo control process is completed.

Figure 5:
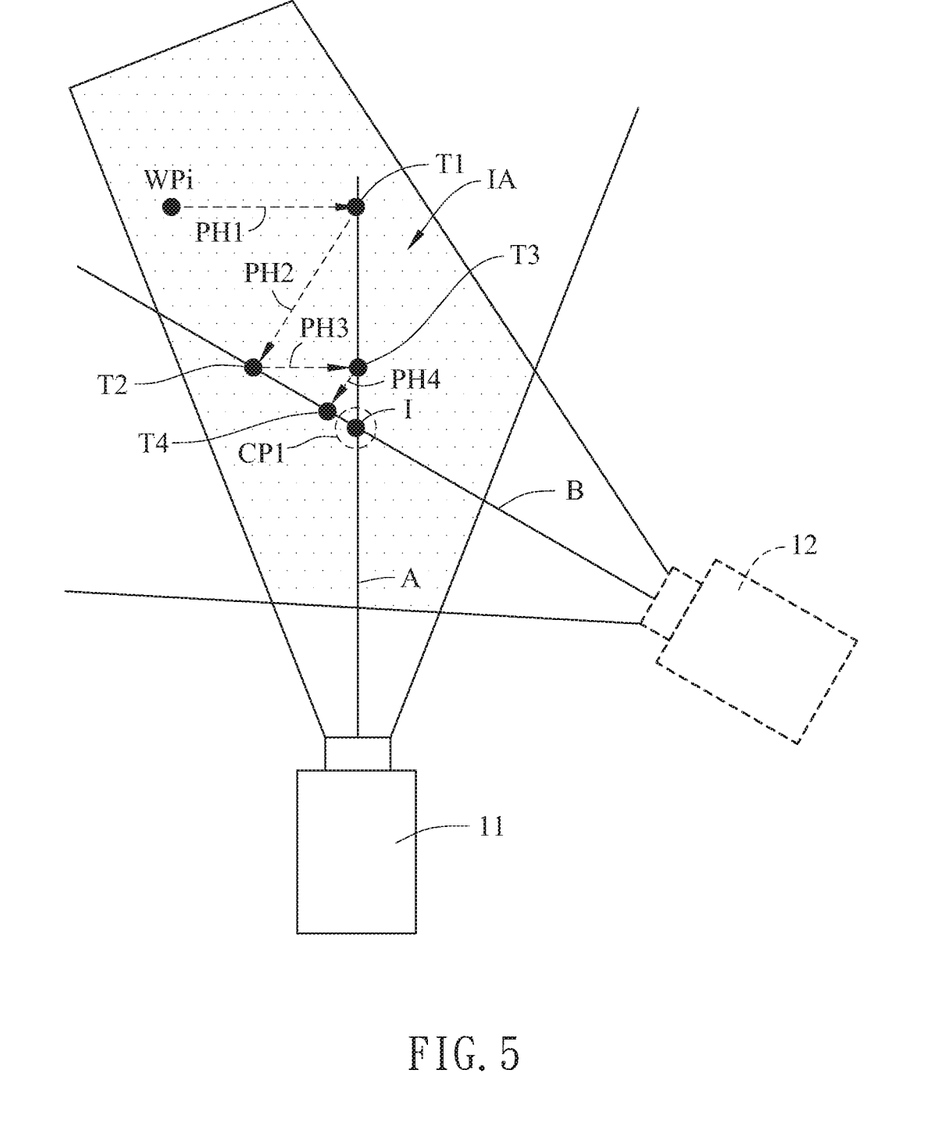
FIG. 5 shows schematically coinciding movement for the first embodiment of FIG. 1.

Referring to FIG. 5, the physical image sensor 11 has a first image central axis A, and the virtual image sensor 12 has a second image central axis B, in which the first image central axis A is not parallel to the second image central axis B, and thus an intersection point I exists between the first image central axis A and the second image central axis B. In addition, the physical image sensor 11 and the virtual image sensor 12 have a common image-overlapped region IA or a common visual field, such that the physical image sensor 11 and the virtual image sensor 12 together can be integrated to form a 2.5D machine vision. The virtual image sensor 12 is not a camera or the like device having a volume, but a simulated object from the physical image sensor 11.

The controller 13 controls the robot R as well as the physical image sensor 11 or the virtual image sensor 12 to rotate synchronously by an angle, so as to have an arbitrary characteristic point WPi on the workpiece W to move repeatedly back and forth between the first image central axis A and the second image central axis B, as shown in FIG. 1. Preferably, the controller 13 can be a computer device. When the characteristic point WPi overlaps the intersection point I of the first image central axis A and the second image central axis B, the controller 13 records immediately a calibration point. Then, based on the calibration point, the robot R changes its posture and ready to find out and record a next calibration point. Thus, a plurality of these calibration points can be recorded at different postures of the robot R. Finally, the controller 13 evaluates the plurality of calibration points to calculate corresponding coordinates of the virtual tool center points TCP and the workpiece W with respect to the robot R, in which each of the calibration points can include coordinates of all the joints J1~J6. In this embodiment, coordinates of individual joints can be respective rotational angles for individual joints with respect to a preset initial point. In other words, one calibration point stands for a set of joint values. For example, if the joint angle $\theta$ is used as the coordinate of the joint, thus coordinates of joints J1~J6 can be expressed by $\theta_{J1}$, $\theta_{J2}$, $\theta_{J3}$, $\theta_{J4}$, $\theta_{J5}$ and $\theta_{J6}$, and hence a calibration point can be expressed by ($\theta_{J1}$, $\theta_{J2}$, $\theta_{J3}$, $\theta_{J4}$, $\theta_{J5}$, $\theta_{J6}$).

From FIG. 5, the controller 13 firstly controls the robot R to move the characteristic point WPi to an arbitrary position within the image-overlapped region IA between the first image central axis A and the second image central axis B. Then, orderly, the controller 13 controls the robot R to move the characteristic point WPi toward the first image central axis A to point T1, as shown by path PH1. Then, the controller 13 controls the robot R to move the characteristic point WPi toward the second image central axis B from point T1 to T2, as shown by path PH2. Similarly, the controller 13 controls the robot R to move the characteristic point WPi toward the first image central axis A from point T2 to point T3, as shown by path PH3. Then, the robot R is controlled to move the characteristic point WPi toward the second image central axis B from point T3 to point T4, as shown by path PH4. Finally, the controller 13 controls the robot R to move the characteristic point WPi toward the first image central axis A from point T4 to the intersection point I gradually. Upon when the characteristic point WPi and the intersection point I are overlapped, a calibration point CP1 is recorded. In this embodiment, if both a distance of the characteristic point WPi to the first image central axis A and that of the characteristic point WPi to the second image central axis B are individually less than a threshold valve, then the characteristic point WPi and the intersection point I can be treated to be overlapped. Generally speaking, the threshold valve can be set to be 50% pixels of the characteristic point WPi. Namely, if 50% pixels of the characteristic point WPi overlap each of the first image central axis A and the second image central axis B, then the characteristic point WPi and the intersection point I can be treated as being overlapped. As described above, the controller 13 controls the robot R to move the characteristic point WPi repeatedly back and forth between the first image central axis A and the second image central axis B, so as to obtain the first calibration point CP1.

Then, the controller 13 goes further to determine whether or not a quantity of the calibration points is larger than or equal to a preset value. In this embodiment, the quantity of the calibration point needs to be larger than or equal to 3. If the quantity of the calibration points is less than 3, then the controller 13 can apply a random-number generator to produce Euler-angle increments $\Delta R_x$, $\Delta R_y$, $\Delta R_z$ for correcting the Euler angles of the robot R so as to vary the posture of the robot R. At this time, the Euler angles of the robot R can be expressed by ($R_x+\Delta R_x$, $R_y+\Delta R_y$, $R_z+\Delta R_z$), in which ($R_x$, $R_y$, $R_z$) stands for the original Euler angle of the robot R, Rx stands for the Yaw angle, Ry stands for the pitch angle, and Rz stands for the roll angle. If the corrected Euler angle exceeds a motion region of the robot R or the overlapped region IA, then the controller 13 would apply again the random-number generator to generate a new set of the Euler-angle increments.

Then, after a new Euler angle and a next characteristic point WPi are obtained, the controller 13 controls the robot R to move the virtual tool center point TCP repeatedly back and forth between the first image central axis A and the second image central axis B. Upon when the virtual tool center point TCP overlaps the second image central axis B, a second calibration point CP2 is recorded.

Then, the controller 13 determines if or not the quantity of the calibration points is larger than or equal to 3. In the case that the controller 13 judges that the quantity of the calibration points is less than 3, then the controller 13 repeats the aforesaid procedures for obtaining and recording a third calibration point CP3. The same process would be repeated until the controller 13 confirms that the quantity of the calibration points is larger than or equal to 3.

As described above, in the calibration process of this disclosure, at least 3 designated points in the workpiece coordinate system are adopted as the aforesaid designated or characteristic points. For example, these three designated points can be the origin of the workpiece coordinate system, an arbitrary point at the X axis of the workpiece coordinate system, and an arbitrary point on the X-Y plane of the workpiece coordinate system. Firstly, the robot R is controlled to move an i-th designated point in the workpiece coordinate system (i.e., the i-th characteristic point WPi on the workpiece W) into an overlapped visual region of the physical image sensor 11 and the virtual image sensor 12. The aforesaid moving operation is repeated until the number i is greater than a present number, so that information-collection process of the designated points for calibration can be completed. Based on the plurality of calibration points, coordinates of the virtual TCP and the workpiece can be calculated.

As shown in FIG. 1, the controller 13 can evaluate the plurality of calibration points CP1-CP3 to calculate coordinates of the virtual tool center point (TCP). In particular, coordinates of each calibration point CP1~CP3 can be obtained through Denavit-Hartenberg parameters of the robot R, coordinates of the joints J1~J6, and information of the virtual tool center point TCP in the coordinate system $(x_f\text{-}y_f\text{-}z_f)$ of the flange F. The Denavit-Hartenberg parameters can include a link offset d, a joint angle θ, a link length a, a link twist u and so on.

The coordinates of the virtual tool center point TCP can be derived by the following equation (6):

$$T1iT2=P \quad (6)$$

in which matrix T1i is a 4×4 transformation matrix for transforming coordinates of the i-th calibration point from the basic coordinate system (xb-yb-zb) to the coordinate system $(x_f\text{-}y_f\text{-}z_f)$ of the flange F, column T2 stands for the coordinates of the virtual tool center point TCP in the coordinate system of the flange F, and column P stands for the coordinates of the calibration point in the basic coordinate system $(x_b\text{-}y_b\text{-}z_b)$. Since each of the calibration points can apply equation (6) to obtain three linear equations, thus 3n linear equations can be obtained for n calibration points. Then, a pseudo-inverse matrix can be applied to derive the coordinates of the virtual tool center point TCP. As shown below, equation (7) is derived from equation (6).

$$\begin{bmatrix} e_{11i} & e_{12i} & e_{13i} & e_{14i} \\ e_{21i} & e_{22i} & e_{23i} & e_{24i} \\ e_{31i} & e_{32i} & e_{33i} & e_{34i} \\ 0 & 0 & 0 & 1 \end{bmatrix} \begin{bmatrix} T_x \\ T_y \\ T_z \\ 1 \end{bmatrix} = \begin{bmatrix} P_x \\ P_y \\ P_z \\ 1 \end{bmatrix} \quad (7)$$

in which column $(e_{11i}, e_{21i}, e_{31i})$ stands for a coordinate vector for the i-th calibration point at the $x_f$-axis of the basic coordinate system $(x_b\text{-}y_b\text{-}z_b)$, column $(e_{12i}, e_{22i}, e_{32i})$ stands for a coordinate vector for the i-th calibration point at the $y_f$-axis of the basic coordinate system $(x_b\text{-}y_b\text{-}z_b)$, and column $(e_{13i}, e_{23i}, e_{33i})$ stands for a coordinate vector for the i-th calibration point at the $z_f$-axis of the basic coordinate system $(x_b\text{-}y_b\text{-}z_b)$. From equation (7), equations (8) and (9) can be derived as follows:

$$\begin{bmatrix} e_{111} & e_{121} & e_{131} & -1 & 0 & 0 \\ e_{211} & e_{221} & e_{231} & 0 & -1 & 0 \\ e_{311} & e_{321} & e_{331} & 0 & 0 & -1 \\ e_{112} & e_{122} & e_{132} & -1 & 0 & 0 \\ e_{212} & e_{222} & e_{232} & 0 & -1 & 0 \\ e_{312} & e_{322} & e_{332} & 0 & 0 & -1 \\ e_{113} & e_{123} & e_{133} & -1 & 0 & 0 \\ e_{213} & e_{223} & e_{233} & 0 & -1 & 0 \\ e_{313} & e_{323} & e_{333} & 0 & 0 & -1 \end{bmatrix} \begin{bmatrix} T_x \\ T_y \\ T_z \\ P_x \\ P_y \\ P_z \end{bmatrix} = \begin{bmatrix} -e_{141} \\ -e_{241} \\ -e_{341} \\ -e_{142} \\ -e_{242} \\ -e_{342} \\ -e_{143} \\ -e_{243} \\ -e_{343} \end{bmatrix} \quad (8)$$

$$\begin{bmatrix} T_x \\ T_y \\ T_z \\ P_x \\ P_y \\ P_z \end{bmatrix} = T_3^t(T_3T_3^t)^{-1} \begin{bmatrix} -e_{141} \\ -e_{241} \\ -e_{341} \\ -e_{142} \\ -e_{242} \\ -e_{342} \\ -e_{143} \\ -e_{243} \\ -e_{343} \end{bmatrix} \quad (9)$$

in which $$T_3 = \begin{bmatrix} e_{111} & e_{121} & e_{131} & -1 & 0 & 0 \\ e_{211} & e_{221} & e_{231} & 0 & -1 & 0 \\ e_{311} & e_{321} & e_{331} & 0 & 0 & -1 \\ e_{112} & e_{122} & e_{132} & -1 & 0 & 0 \\ e_{212} & e_{222} & e_{232} & 0 & -1 & 0 \\ e_{312} & e_{322} & e_{332} & 0 & 0 & -1 \\ e_{113} & e_{123} & e_{133} & -1 & 0 & 0 \\ e_{213} & e_{223} & e_{233} & 0 & -1 & 0 \\ e_{313} & e_{323} & e_{333} & 0 & 0 & -1 \end{bmatrix},$$

$T_3^t$ is a transpose matric of $T_3$, and $(T_3T_3^t)^{-1}$ is an inverse matrix of $(T_3T_3^t)$.

If the quantity of the calibration points is met, plug entries of matrix $T_{1i}$ with respect to the known i-th calibration point into equation (8), and, through a shift operation upon matrix $T_3$, equation (9) can be obtained. Thus, coordinates $(T_x, T_y, T_z)$ of the virtual tool center point TCP in the coordinate system of the flange F and coordinates $(P_x, P_y, P_z)$ of the virtual tool center point TCP in the coordinate system of the robot R $(x_R\text{-}y_R\text{-}z_R)$ can be obtained, calibrations of coordinates $(T_x, T_y, T_z)$ of the virtual tool center point TCP can be completed, and coordinates for the workpiece W can be calculated.

As described above, in this embodiment, the automated calibration system for a workpiece coordinate frame of a robot 1 can apply the visual servo means to automatically calibrate the coordinate of the robot with respect to the workpiece to be machined, with an acceptable calibration precision. Thus, related labor and time cost can be effectively reduced. In addition, since the automated calibration system for a workpiece coordinate frame of a robot 1 can calibrate the coordinates of the robot with respect to the workpiece in a single calibration process, so the automated calibration system 1 provided by this disclosure can effectively improve existing shortcomings in the art.

Figure 6:
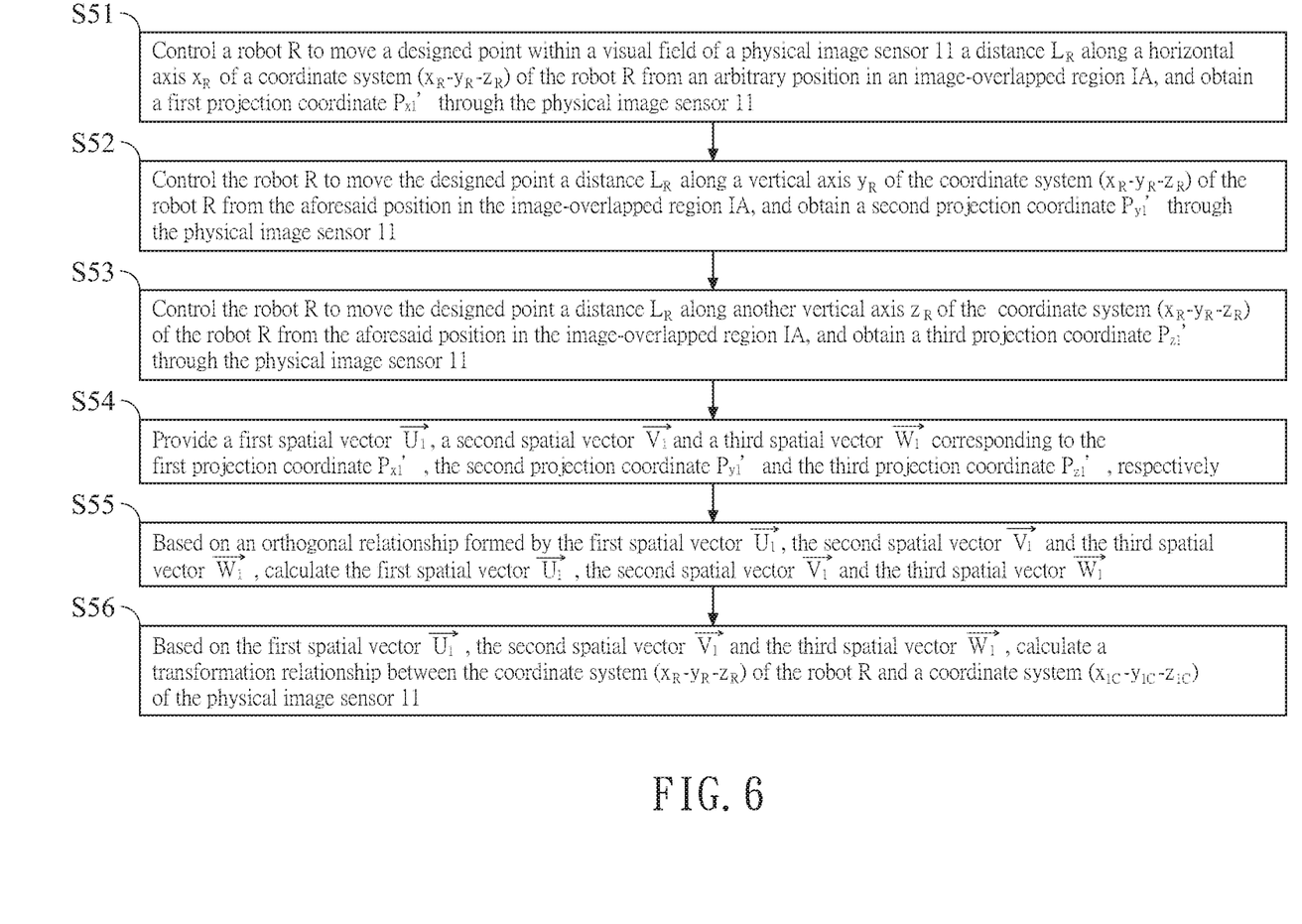
FIG. 6 is a schematic flowchart of a first portion of a first embodiment of the automated calibration system for a workpiece coordinate frame of a robot in accordance with this disclosure.

Referring now to FIG. 6, the method for obtaining a transformation relationship between the coordinate system $(x_R\text{-}y_R\text{-}z_R)$ of the robot R and the coordinate system $(x_{1C}\text{-}y_{1C}\text{-}z_{1C})$ of the physical image sensor 11 can include the following steps.

Step S51: Control the robot R to move an arbitrary designed point within a visual field of the physical image sensor 11 a distance LR along a horizontal axis $x_R$ of the coordinate system $(x_R\text{-}y_R\text{-}z_R)$ of the robot R from an arbitrary position in an image-overlapped region IA, and obtain a first projection coordinate $P_{x1}'$ through the physical image sensor 11.

Step S52: Control the robot R to move the designed point the distance $L_R$ along a vertical axis $y_R$ of the coordinate system $(x_R\text{-}y_R\text{-}z_R)$ of the robot R from the aforesaid position in the image-overlapped region IA, and obtain a second projection coordinate $P_{y1}'$ through the physical image sensor 11.

Step S53: Control the robot R to move the designed point the distance LR along another vertical axis $z_R$ of the coordinate system $(x_R\text{-}y_R\text{-}z_R)$ of the robot R from the aforesaid position in the image-overlapped region IA, and obtain a third projection coordinate $P_{z1}'$ through the physical image sensor 11.

Step S54: Provide a first spatial vector $\vec{U}_1$, a second spatial vector $\vec{V}_1$ and a third spatial vector $\vec{W}_1$ corresponding to the first projection coordinate $P_{x1}'$, the second projection coordinate $P_{y1}'$ and the third projection coordinate $P_{z1}'$, respectively.

Step S55: Based on an orthogonal relationship formed by the first spatial vector $\vec{U}_1$, the second spatial vector $\vec{V}_1$ and the third spatial vector $\vec{W}_1$, calculate the first spatial vector $\vec{U}_1$, the second spatial vector $\vec{V}_1$ and the third spatial vector $\vec{W}_1$.

Step S56: Based on an orthogonal relationship formed by the first spatial vector $\vec{U}_1$, the second spatial vector $\vec{V}_1$ and the third spatial vector $\vec{W}_1$, calculate the first spatial vector $\vec{U}_1$, the second spatial vector $\vec{V}_1$ and the third spatial vector $\vec{W}_1$, referring to equation (4).

Figure 7:
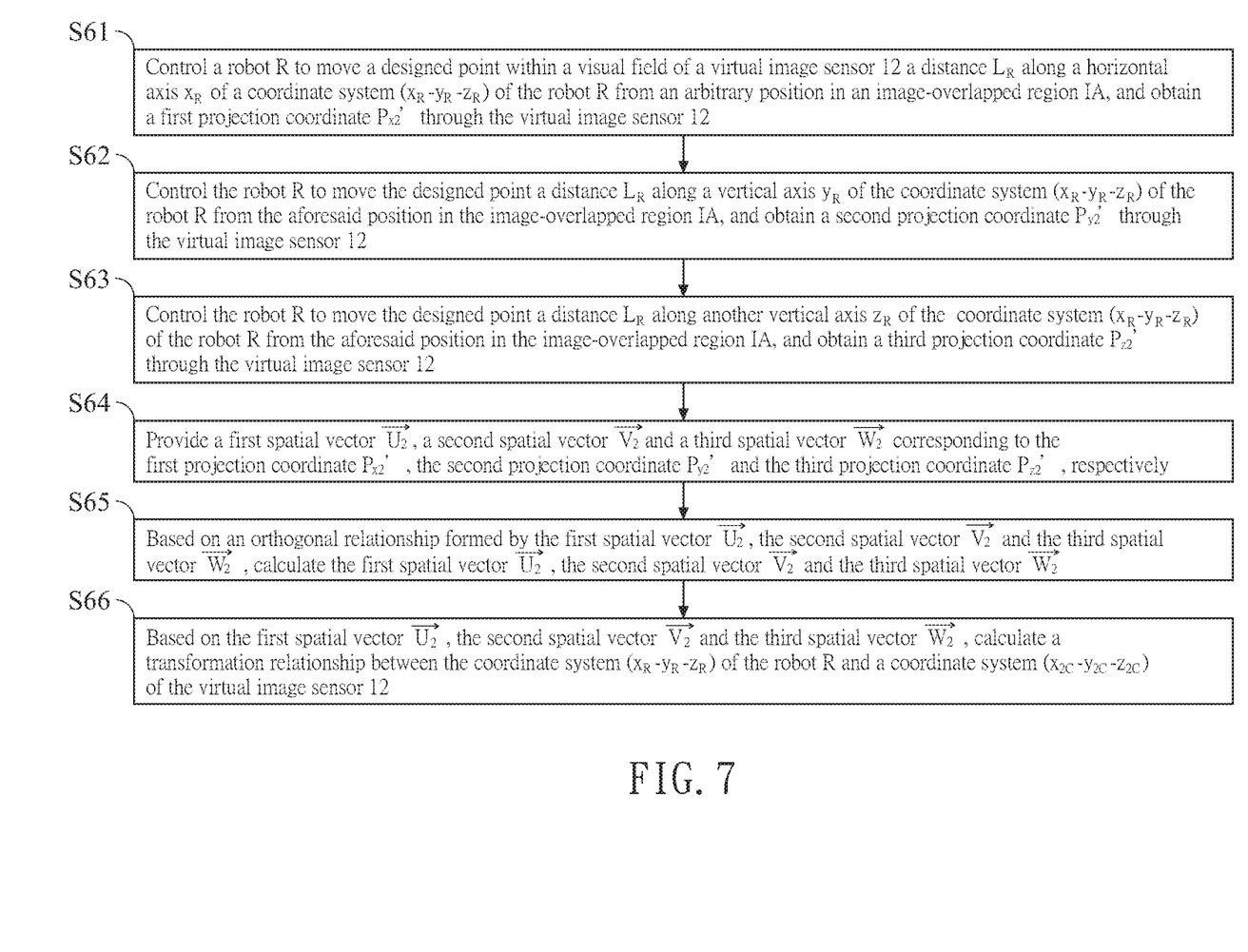
FIG. 7 is a schematic flowchart of a second portion of the first embodiment of the automated calibration system for a workpiece coordinate frame of a robot in accordance with this disclosure.

Referring to FIG. 7, the method for obtaining a transformation relationship between the coordinate system $(x_R\text{-}y_R\text{-}z_R)$ of the robot R and the coordinate system $(x_2\text{-}y_{2c}\text{-}2_c)$ of the virtual image sensor 12 can include the following steps.

Step S61: Control the robot R to move an arbitrary designed point within a visual field of the virtual image sensor 12 a distance $L_R$ along a horizontal axis $x_R$ of the coordinate system $(x_R\text{-}y_R\text{-}z_R)$ of the robot R from an arbitrary position in an image-overlapped region IA, and obtain a first projection coordinate $P_{x2}'$ through the virtual image sensor 12.

Step S62: Control the robot R to move the designed point the distance $L_R$ along a vertical axis $y_R$ of the coordinate system $(x_R\text{-}y_R\text{-}z_R)$ of the robot R from the aforesaid position in the image-overlapped region IA, and obtain a second projection coordinate $P_{y2}'$ through the virtual image sensor 12.

Step S63: Control the robot R to move the designed point the distance $L_R$ along another vertical axis $z_R$ of the coordinate system $(x_R\text{-}y_R\text{-}z_R)$ of the robot R from the aforesaid position in the image-overlapped region IA, and obtain a third projection coordinate $P_{z2}'$ through the virtual image sensor 12.

Step S64: Provide a first spatial vector $\vec{U}_2$, a second spatial vector $\vec{V}_2$ and a third spatial vector $\vec{W}_2$ corresponding to the first projection coordinate $P_{x2}'$, the second projection coordinate $P_{y2}'$ and the third projection coordinate $P_{z2}'$ respectively.

Step S65: Based on an orthogonal relationship formed by the first spatial vector $\vec{U}_2$, the second spatial vector $\vec{V}_2$ and the third spatial vector $\vec{W}_2$, calculate the first spatial vector $\vec{U}_2$, the second spatial vector $\vec{V}_2$ and the third spatial vector $\vec{W}_2$.

Step S66: Based on the first spatial vector $\vec{U}_2$, the second spatial vector $\vec{V}_2$ and the third spatial vector $\vec{W}_2$, calculate a transformation relationship between the coordinate system $(x_R\text{-}y_R\text{-}z_R)$ of the robot R and a coordinate system $(x_{2C}\text{-}y_{2C}\text{-}z_{2C})$ of the virtual image sensor 12, referring to equation (8).

Figure 8:
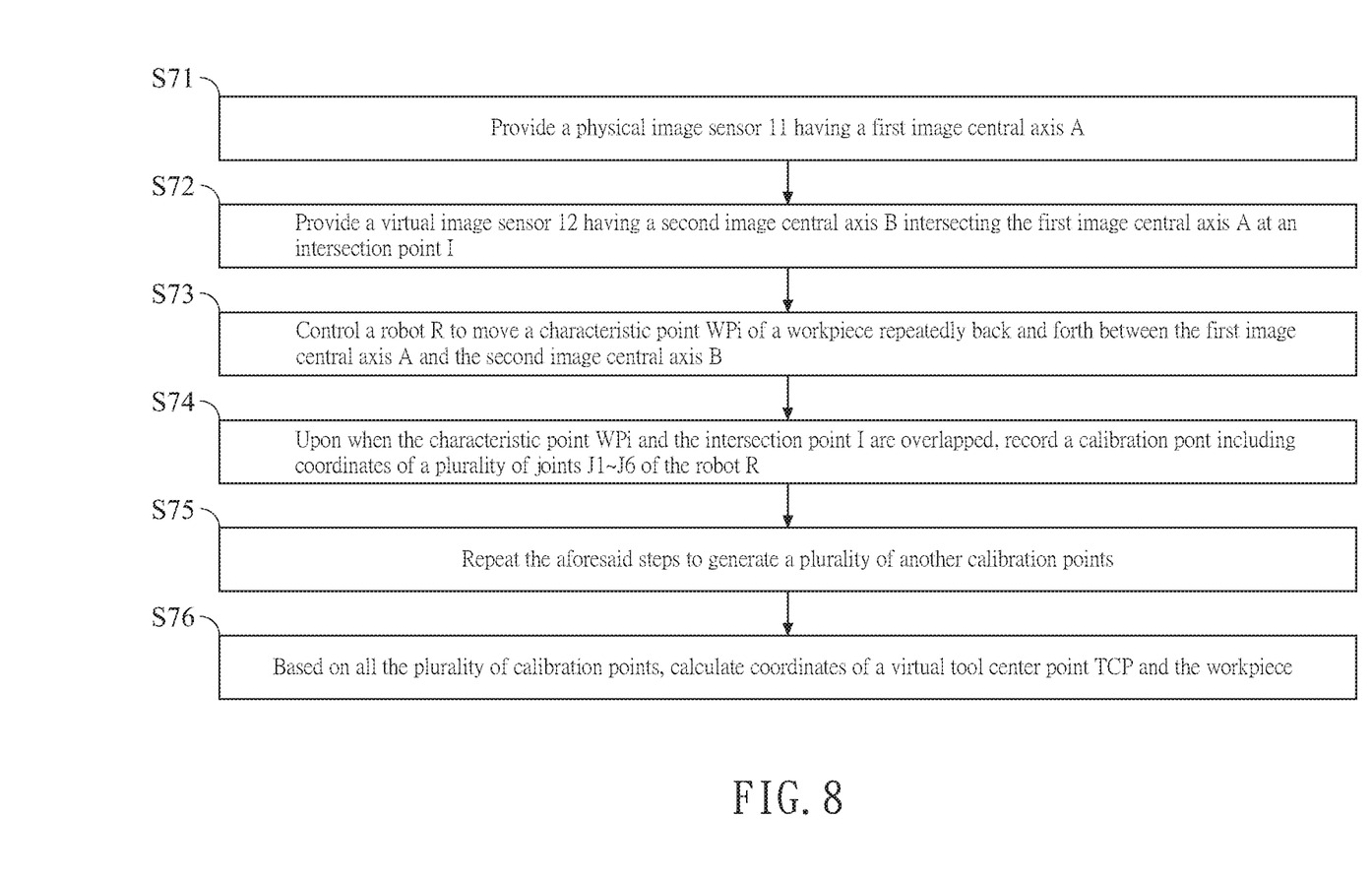
FIG. 8 is a schematic flowchart of a third portion of a first embodiment of the automated calibration system for a workpiece coordinate frame of a robot in accordance with this disclosure.

Referring now to FIG. 8, the method for the automated calibration system for a workpiece coordinate frame of a robot 1 includes the following steps.

Step S71: Provide a physical image sensor 11 having a first image central axis A.

Step S72: Provide a virtual image sensor 12 having a second image central axis B intersecting the first image central axis A at an intersection point I.

Step S73: Control a robot R to move a characteristic point WPi of a workpiece repeatedly back and forth between the first image central axis A and the second image central axis B.

Step S74: Upon when the characteristic point WPi and the intersection point I are overlapped, record a calibration point including coordinates of a plurality of joints J1~J6 of the robot R.

Step S75: Repeat the aforesaid steps to generate a plurality of another calibration points.

Step S76: Based on all the plurality of calibration points, calculate coordinates of a virtual tool center point TCP and the workpiece.

Figure 9:
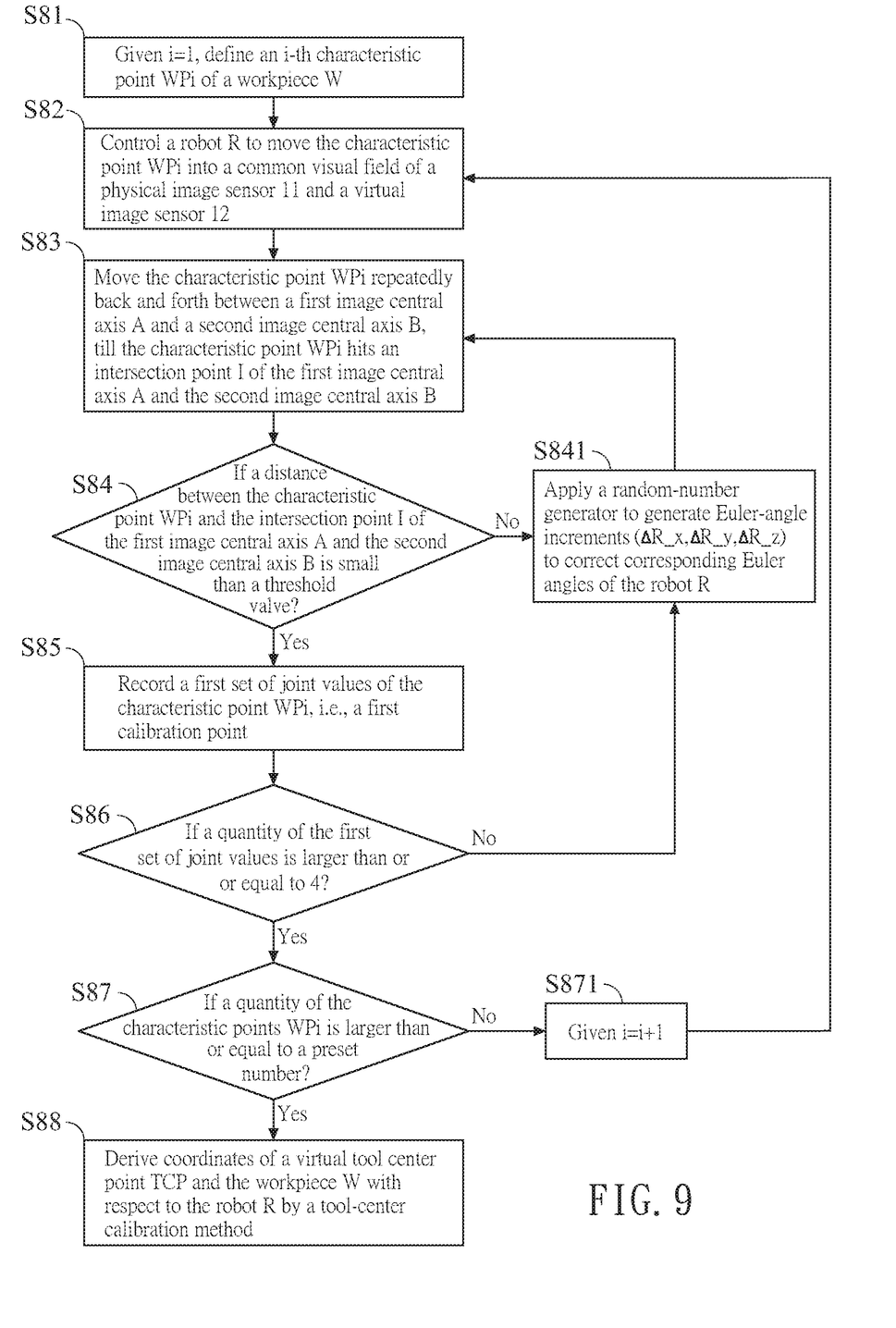
FIG. 9 is a schematic flowchart of a fourth portion of a first embodiment of the automated calibration system for a workpiece coordinate frame of a robot in accordance with this disclosure.

Referring now to FIG. 9, a detail flowchart of the automated calibration method for a workpiece coordinate frame of a robot in accordance with this disclosure includes the following steps.

Step S81: Given i=1, define an i-th characteristic point WPi of a workpiece W.

Step S82: A controller 13 controls a robot R to move the characteristic point WPi into a common visual field of a physical image sensor 11 and a virtual image sensor 12.

Step S83: The controller 13 moves the characteristic point WPi repeatedly back and forth between a first image central axis A and a second image central axis B, until the characteristic point WPi hits an intersection point I of the first image central axis A and the second image central axis B.

Step S84: The controller 13 determines whether or not a distance between the characteristic point WPi and the intersection point I of the first image central axis A and the second image central axis B is smaller than a threshold valve. If positive, go to perform Step S85. If negative, then go to perform Step S841.

Step S841: The controller 13 applies a random-number generator to generate Euler-angle increments $(\Delta R_x, \Delta R_y, \Delta R_z)$ to correct corresponding Euler angles of the robot R, and the method goes back to perform Step S83.

Step S85: The controller 13 records a first set of joint values of the characteristic point WPi, i.e., a first calibration point.

Step S86: The controller 13 determines whether or not a quantity of the first set of joint values is larger than or equal to 4. If positive, go to perform Step S87. If negative, go to perform Step S841. In this disclosure, the aforesaid quantity can be any other integer.

Step S87: The controller 13 determines whether or not a quantity of the characteristic points WPi is larger than or equal to a preset number. If positive, go to perform Step S88. If negative, go to perform Step S871.

Step S871: Given i=i+1.

Step S88: Derive coordinates of a virtual tool center point TCP and the workpiece W with respect to the robot R by a tool-center calibration method which is disclosed in the prior application.

As described above, in the automated calibration system and method for a workpiece coordinate frame of a robot provided by this disclosure, the calibration process mainly includes four portions: (1) mounting a physical image sensor on a flange at an end of the robot; (2) obtaining a transformation relationship between a coordinate system of the flange of the robot and that of the physical image sensor so as to transform motion information captured as an image into information convenient for the robot; (3) applying a multi-vision means to construct the virtual image sensor and the position of the virtual tool center point so as to generate a 2.5D machine vision; and, (4) applying a visual servo means to control the robot to overlap a designated point on the workpiece and an intersection point of two image axes. In addition, the aforesaid overlapping operation can be achieved by any of the two following method: (41) controlling the robot having four, for example, different postures to overlap the virtual tool center point and the origin of the workpiece coordinate system, then overlapping the virtual tool center point of any posture of the robot and each of an arbitrary point at an X axis of the workpiece coordinate system and another arbitrary point on the X-Y plane, and recording the coordinates; or (42) controlling the robot having four, for example, different postures to overlap the virtual tool center point and each of four known coordinate points on the workpiece of the workpiece coordinate system, and recording the coordinates.

According to this disclosure, only one physical image sensor is needed to be furnished onto the flange at the end of the robot, and, through calibrating the characteristic points, the calibration process avoids direct contact between the workpiece and the robot, and can complete the position correction of the workpiece in a single calibration process. Thereupon, the calibration precision can be effectively enhanced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A automated calibration system for a workpiece coordinate frame of a robot, comprising:
   a physical image sensor, having a first image central axis, disposed on a flange at an end of the robot; and
   a controller, connected with the robot and the physical image sensor, used for controlling the physical image sensor and the robot to construct a virtual image sensor having a second image central axis, the second image central axis intersecting the first image central axis to form an intersection point;
   wherein the controller controls the robot to move back and forth between the first image central axis and the second image central axis until a characteristic point on the workpiece overlaps the intersection point, the characteristic point as a calibration point, out of a plurality of calibration points, including coordinates of a plurality of joints of the robot is recorded, then a next characteristic point is introduced to repeat the aforesaid movement for overlapping the intersection point again until a number of the plurality of calibration points is accepted, and each of the plurality of calibration points is evaluated to calculate coordinates of a virtual tool center point and the workpiece with respect to the robot; and
   wherein, when the characteristic point overlaps the intersection point of the first image central axis and the second image central axis, a distance between the characteristic point and the first image central axis and another distance between the characteristic point and the second image central axis are less than a threshold valve.

2. The automated calibration system of claim 1, wherein the controller controls the robot to move according to a coordinate system of the robot with respect to a transformation relationship of another coordinate system of the physical image sensor and the virtual image sensor, and a plurality of images of the physical image sensor and the virtual image sensor.

3. The automated calibration system of claim 1, wherein each of the plurality of calibration points includes rotational angles of the plurality of joints with respect to a preset point.

4. The automated calibration system of claim 3, wherein the controller calculates coordinates of the virtual tool center point according to the plurality of calibration points and a Denavit-Hartenberg parameter of the robot.

5. The automated calibration system of claim 1, wherein a quantity of the plurality of calibration points is larger than or equal to a preset value.

6. The automated calibration system of claim 5, wherein, upon when the quantity of the plurality of calibration points is less than the preset value, the controller applies a random-number generator to generate an Euler-angle increment for correcting an Euler angle of the robot.

7. The automated calibration system of claim 6, wherein, after the controller corrects the Euler angle of the robot, the controller controls the robot to move repeatedly another characteristic point back and forth between the first image central axis and the second image central axis so as to obtain another calibration point, until the quantity of the calibration point is larger than or equal to the preset value.

8. The automated calibration system of claim 1, wherein coordinates of the virtual tool center point are coordinates with respect to a base or the flange of the robot.

9. An automated calibration method for a workpiece coordinate frame of a robot, the robot connecting a controller, comprising the steps of:
   (i) providing a physical image sensor, forming an image coordinate system and having a first image central axis, disposed on a flange at an end of the robot;
   (ii) applying the controller to rotate the physical image sensor and the robot to construct a virtual image sensor having a second image central axis, the second image central axis intersecting the first image central axis to form an intersection point;
   (iii) controlling the robot, by the controller, to move back and forth between the first image central axis and the second image central axis, until a characteristic point on the workpiece and the intersection point are overlapped, and recording as a calibration point including coordinates of a plurality of joints of the robot wherein a first distance between the characteristic point and the first image central axis is less than a threshold value, and a second distance between the characteristic point and the second image central axis is less than the threshold valve;
   (iv) controlling the robot, by the controller, to move according to the aforesaid movement to overlap a next characteristic point with the intersection point for generating a plurality of other calibration points; and
   (v) calculating coordinates of a virtual tool center point and the workpiece with respect to the robot based on each of the plurality of calibration points.

10. The automated calibration method of claim 9, further including a method for constructing the virtual image sensor, the method for constructing the virtual image sensor including the steps of:
   (a) moving the robot to fall the characteristic point into a visual field of the physical image sensor, and obtaining coordinates of an arbitrary point within the visual field with respect to the flange;

(b) obtaining a first point in the coordinate system of the physical image sensor, rotating by two different angles about the first image central axis to generate a second point and a third point, and calculating a center position according to the first point, the second point and the third point;

(c) calculating a vector from the center position to a tool-image center, and transforming the vector in the image coordinate system into another vector with respect to the flange, the tool-image center being an intersection point of a coordinate axis of a tool and the first image central axis;

(d) correcting coordinates of the first point, going back to perform Step (a) until the center position overlaps the tool-image center, and then obtaining a tool center coordinate; and (e) rotating the physical image sensor about an arbitrary coordinate axis of the flange by an angle so as to form the virtual image sensor.

11. The automated calibration method of claim 9, wherein the Step (iii) further includes the steps of:

providing a transformation relationship between a coordinate system of the robot and another coordinate system of the physical image sensor and the virtual image sensor; and based on the transformation relationship, the physical image sensor and a plurality of images of the virtual image sensor, controlling the robot to move.

12. The automated calibration method of claim 11, wherein the step of providing the transformation relationship further includes the steps of:

controlling the robot to move the characteristic point a distance along a horizontal axis of the coordinate system of the robot from an arbitrary position within an image-overlapped region of the physical image sensor and the virtual image sensor, and obtaining a first projection coordinate from the physical image sensor and the virtual image sensor;

controlling the robot to move the characteristic point the distance along a vertical axis of the coordinate system of the robot from the arbitrary position within the image-overlapped region of the physical image sensor and the virtual image sensor, and obtaining a second projection coordinate from the physical image sensor and the virtual image sensor; and controlling the robot to move the characteristic point the distance along another vertical axis of the coordinate system of the robot from the arbitrary position within the image-overlapped region of the physical image sensor and the virtual image sensor, and obtaining a third projection coordinate from the physical image sensor and the virtual image sensor.

13. The automated calibration method of claim 12, wherein the step of providing the transformation relationship further includes the steps of:

providing a first spatial vector, a second spatial vector and a third spatial vector corresponding to the first projection coordinate, the second projection coordinate and the third projection coordinate, respectively;

based on an orthogonal relationship among the first spatial vector, the second spatial vector and the third spatial vector, calculating the first spatial vector, the second spatial vector and the third spatial vector; and based on the first spatial vector, the second spatial vector and the third spatial vector, calculating the transformation relationship between the coordinate system of the robot and that of the physical image sensor and the virtual image sensor.

14. The automated calibration method of claim 9, wherein coordinates of each of the plurality of joints are rotational angles of the plurality of joints with respect to a preset point.

15. The automated calibration method of claim 9, wherein the Step (v) further includes a step of, based on the plurality of calibration points and a Denavit-Hartenberg parameter of the robot, calculating coordinates of the virtual tool center point and the workpiece.

16. The automated calibration method of claim 9, wherein a quantity of the plurality of calibration points is larger than or equal to a preset value.

17. The automated calibration method of claim 9, wherein the Step (iv) further includes a step of, upon when a quantity of the plurality of calibration points is less than a preset value, applying a random-number generator to generate an Euler-angle increment for correcting an Euler angle of the robot.

18. The automated calibration method of claim 17, further including a following step of controlling the robot to move repeatedly another characteristic point back and forth between the first image central axis and the second image central axis so as to obtain another calibration point, until a quantity of the calibration points is larger than or equal to the preset value.

* * * * *